Patented Feb. 28, 1950

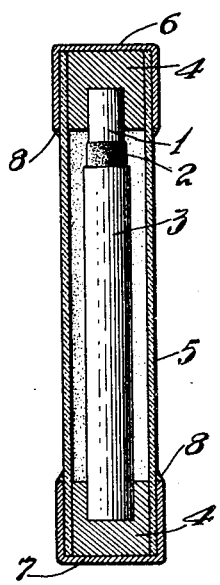
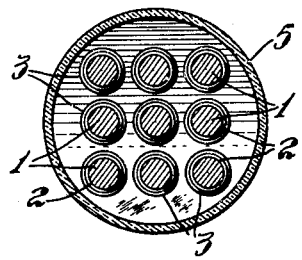
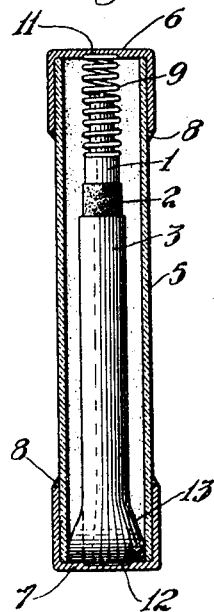
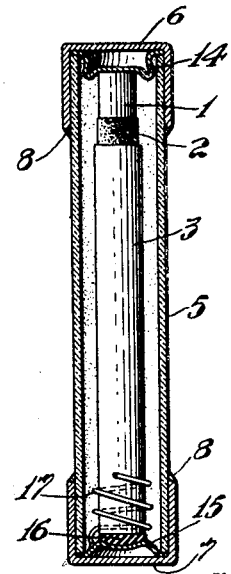

2,498,666

UNITED STATES PATENT OFFICE 2,498,666

RECTIFIER UNIT

Charles A. Escoffery and Walter H. Hawk, East Orange, N. J., assignors to Federal Telephone and Radio Corporation, New York, N. Y., a corporation of Delaware Application October 10, 1946, Serial No. 702,518

4 Claims. (Cl. 175—366)

The present invention relates to selenium rectifiers and, more particularly, to a method and means for enclosing metal contact rectifiers.

One of the objects of this invention is to provide enclosed rectifier units of improved designs which may be simply constructed and easily assembled.

A second object is to provide rod-shaped rectifiers with air-tight enclosures and methods for producing same.

Further, it is an object to provide methods and means for hermetically sealing selenium rectifiers within enclosures, and for insuring good electrical contact between rectifier terminals and conductors external to the enclosures.

The following discussion and description of preferred embodiments and particular methods associated with the present invention should aid in an understanding of the foregoing objects and features as well as make apparent other objects and features not enumerated, reference being had to the accompanying drawings, in which:

Figure 1 illustrates a cylindrical selenium rectifier enclosed in a sealed glass and metal cartridge shown in section.

Figure 2 is a cross-section of a plurality of rectifiers constructed in accordance with this invention and enclosed within a single cartridge.

Figure 3 shows a hermetically sealed cylindrical rectifier arrangement including resilient means for positioning and electrically contacting the rectifier unit.

Figure 4 discloses alternative resilient positioning and contacting means for a cylindrical rectifier unit.

The cylindrical metal contact rectifiers shown in all of the figures are each comprised of a rod 1 of a base metal, which may be of aluminum, iron or other suitable metal, a selenium coating 2 thereon, though not completely covering the rod, and a counter-electrode alloy coating 3 partially covering the selenium coating and in no place directly contacting the aluminum rod. Separate contacts with the rod as one electrode and with the alloy coating as the other electrode are provided in the embodiment of Figure 1 by means of the conducting alloy 4 adhering to these sections. Since hermetic sealing of the complete rectifier unit is desired, a tube of glass or other insulating and non-porous material 5 is provided for enclosing the unit, and metallic end caps, 6 and 7, are jointed therewith by the glass-to-metal seals 8. Electrical contact between end caps and the rectifier unit is established by the alloy 4 which adheres both to the unit and to the metallic caps and which additionally serves to position the rectifier within the insulating tube 5.

Preparation of the rod-shaped rectifier unit may involve any conventional processes for treating the aluminum, applying a coating of selenium to part of the aluminum rod, coating certain portions of the selenium with a metallic alloy, and electroforming to achieve rectifying characteristics. The glass tube, having an opening large enough to accommodate the rectifier unit, is metalized at its ends for sealing purposes. A small amount of low melting point alloy in a molten state is placed into one of the end caps, one end of the rectifier unit is inserted into the molten alloy, and the alloy is permitted to solidify. The edge of the cap is soldered at 8 to the metalized surfaces of the tube 5. The other end cap is similarly applied, it being substantially filled with molten alloy, and the tube inserted therein such that the alloy contacts and partially surrounds the rectifier unit. After the alloy is allowed to solidify, the cap is soldered to the tube to complete the hermetic sealing and mounting of the rectifier. The two soldering operations, of course, may be performed at the same time, that is, after both caps have been applied.

The invention is not limited to the arrangements in which the electrodes of an enclosed rectifier are themselves imbedded in the bonding alloy. In an alternative mounting, a metal contact rectifier may, for example, have conductors extending from its electrodes and these conductors may be bonded with the alloy material.

Figure 2 illustrates a plurality of rectifier units mounted within a single enclosure, each unit being constructed in accordance with the above disclosure and all units being similarly positioned within the tube 5. This arrangement provides a greater effective rectifying area and heat dissipating area than could be obtained with one solid rectifier rod of equivalent cross-sectional area.

It is not necessary that there be a solid connection between the end caps and rectifier unit as indicated by the alloy 4 in Figure 1. An alternate arrangement is shown in Figure 3, wherein a conductive spring member 9, coupled to the reduced end 10, of rod 1, and fitting in the depression 11 of the end cap 6 aids in maintaining the concentric alignment of the rod with tube 5 and provides an electrical connection between the rod and end cap. At the opposite end of the tube, the metallic coating 3 may contact the end cap 7 in a depression 12 which also assists in preserving the alignment of the rod and tube. It is preferred, however, to enlarge the coated end of rod 1 as indicated at 13 to reduce the pressure per unit area on the coatings by distributing this pressure over a greater area. While the caps are shown with depressions 11 and 12, such depressions may be omitted since true alignment of the rod in tube 5 is not essential. Also other types of spring arrangements may be used at 9.

In Figure 4 two resilient conductive members are indicated by numerals 14 and 15 associated with end caps 6 and 7 respectively. The resiliency of these cup-shaped members insures a firm pressurized contact between the members, the caps, and the rectifier unit, and the assembly process is much simplified as compared with those in which a molten alloy must be employed. Although it is possible that two members similar to member 14 might be used to construct one sealed rectifier, it is more advantageous to employ the arrangements of Figure 4 wherein the alloy coating at the base of the rod is prevented from shorting with the base-plate by the pressure-distributing resilient pad 16 preferably of insulating material, the electrical connection being made between the resilient member 15 and alloy 3 through a flexible lead 17. If desired, the alloy coating need not cover that portion of rod 1 which contacts resilient pad 16. It is not essential that the member indicated by numeral 16 be a resilient pad in this instance, it may be a layer of paint, paper, or other insulating material, or may be an anodized layer on either the rod or the resilient member 15. Further, only one resilient member, either 14 or 15 need be employed, particularly where one provides sufficient contact pressure.

Although the present invention has been described with reference to the foregoing preferred embodiments, it should be apparent that this is intended merely for purposes of illustration and that many changes might be instituted by those skilled in the art without departing in spirit or principle from the above disclosures. For example, any sealing method other than the solder glass-to-metal seal may be utilized if a desired hermetic enclosure is produced, any desired number of cylindrical rectifiers in any desired arrangement may be enclosed in a single sealed tube, the tube may be of any material which provides a hermetic seal and which is not affected by atmospheric conditions, the rectifiers may be of any metal contact type whose construction lends itself favorably to the disclosed arrangement, the tubes and rectifier rods may have any desired cross-sectional configuration, and other forms of resilient members might well be substituted for those illustrated. Further, while in Figs. 3 and 4 special spring arrangements have been shown to insure compression contact, such may be omitted by placing the caps under pressure against the ends of the rectifier rods during the soldering of the caps to the tube. The ends of the rod may be in such case, either as shown in Fig. 1 or enlarged as indicated at 13 in Fig. 3.

Therefore, the scope of this invention should not be considered limited by those preferred embodiments which have been referred to in the above disclosure.

We claim:

1. A rectifier comprising a metal rod base element carrying a coating of semiconductive selenium upon all but one end portion thereof and a counterelectrode layer overlying the selenium coating unit, an insulating tube, conductive end caps hermetically sealing the ends of said tube, and conductive material bonding each of said end caps with one electode of said rectifier to make said electrodes integral with said end caps.

2. An enclosed selenium rectifier comprising, a conductive rod, a selenium coating covering a portion thereof, a metallic coating substantially covering said selenium coating, an insulating tube surrounding said rod, conductive end caps hermetically sealed to said tube and closing the ends thereof, and conductive material bonding one end cap integrally with said rod and a second conductive material bonding the other end cap integrally with said metallic coating.

3. The method of producing an enclosed rectifier which comprises, placing a quantity of molten conductive material into a conductive cap, inserting one end of a rod-shaped rectifier comprising a metal rod base element carrying a coating of semiconductive selenium upon all but one end portion thereof and a counterelectrode layer overlying the selenium coating, and one end of an insulating tube into said molten material, said material bonding said one end of the rod-shaped rectifier integrally with said cap upon solidifying, placing molten material in a second conductive cap, and inserting the other ends of said tube and said rod-shaped rectifier into said molten material, said material bonding the other end of said rectifier integrally with said second cap upon solidifying whereby the caps and insulating tube constitute a hermetically sealed enclosure for the rectifier.

4. The method of producing a sealed rectifier which comprises, coating all but one end of a metallic rod with selenium, coating substantially all of said selenium coating with a metallic alloy, placing a quantity of molten alloy into a metallic cap, inserting the alloy-coated end of said rod and one end of an insulating tube into said molten alloy, said alloy bonding said alloy-coated end integrally with said cap upon solidifying, placing molten alloy in a second metallic cap, and inserting said tube and the uncoated end of said rod into said alloy, said alloy bonding said uncoated end integrally with said second cap upon solidifying.

CHARLES A. ESCOFFERY.
WALTER H. HAWK.

REFERENCES CITED

The following references are of record in the file of this patent:

UNITED STATES PATENTS

| Number | Name | Date |
| --- | --- | --- |
| 1,781,088 | Strobel | Nov. 11, 1930 |
| 1,833,332 | Peter | Nov. 24, 1931 |
| 2,156,054 | Geisler et al. | Apr. 25, 1939 |

FOREIGN PATENTS

| Number | Country | Date |
| --- | --- | --- |
| 290,985 | Great Britain | Aug. 21, 1929 |
| 516,394 | Germany | Jan. 22, 1931 |